US008922431B2

(12) United States Patent
Bruno

(10) Patent No.: US 8,922,431 B2
(45) Date of Patent: Dec. 30, 2014

(54) APPARATUS, A SYSTEM AND A METHOD FOR COLLISSION AVOIDANCE

(75) Inventor: Michael Volta Bruno, Johannesburg (ZA)

(73) Assignee: Becker Research and Development (Proprietary) Limited, Province (ZA)

( * ) Notice: Subject to any disclaimer, the term of this patent is extended or adjusted under 35 U.S.C. 154(b) by 880 days.

(21) Appl. No.: 13/081,857

(22) Filed: Apr. 7, 2011

(65) Prior Publication Data

US 2011/0249118 A1   Oct. 13, 2011

Related U.S. Application Data

(60) Provisional application No. 61/323,368, filed on Apr. 13, 2010.

(51) Int. Cl.
*G01S 3/02* (2006.01)
*H04N 7/18* (2006.01)
*B60W 30/095* (2012.01)
*B60W 50/14* (2012.01)

(52) U.S. Cl.
CPC ........... *B60W 30/0953* (2013.01); *B60W 50/14* (2013.01); *B60W 2550/40* (2013.01); *B60W 2550/408* (2013.01)
USPC ........... 342/450; 342/455; 342/463; 342/464; 342/465; 342/459; 348/148

(58) Field of Classification Search
USPC ........... 348/148; 342/450, 455, 463–465, 459
See application file for complete search history.

(56) References Cited

U.S. PATENT DOCUMENTS 5,083,861 A * 1/1992 Chi .............................. 356/5.05
6,307,503 B1 * 10/2001 Liu ........................... 342/357.77
6,853,687 B2    2/2005 Harrington et al.
7,167,082 B2    1/2007 Stigall
(Continued)

FOREIGN PATENT DOCUMENTS

WO        00/79502 A1    12/2000
WO        02/50796 A1     6/2002
WO     2004/090830 A1    10/2004

OTHER PUBLICATIONS

Levesque et al.; Performance Issues Concerning Doppler_Only Localization of Submarine Targets; Saclantcen Report, serial No. SR-325; Jul. 2000; 49 pages.*

*Primary Examiner* — Helen Shibru
(74) *Attorney, Agent, or Firm* — Ladas & Parry LLP

(57) ABSTRACT

The invention relate to a collision avoidance apparatus (100, 200, 300, 22), system (10) and method (500). The apparatus (100, 200, 300, 22) includes a UHF (Ultra High Frequency) transceiver (102) operable to send and receive UHF signals in electric field (E-field) mode, a VLF (Very Low frequency) transceiver (104) operable to send and receive VLF signals in magnetic field (H-field) mode, and a SHF (Super High Frequency) transceiver (106) operable to send and receive SHF signals in electric field (E-field) mode. The apparatus (100, 200, 300, 22) further includes a control module (110) operable to direct the operation of the respective transceivers (102, 104, 106), thereby to detect receipt of a signal via at least one of the transceivers (102, 104, 106), and determine whether or not an alert is to be issued, based on the nature of the received signal. The apparatus (102, 104, 106) also includes an output arrangement (112) operable to issue an alert in response to instruction from the control module (110) to do so.

25 Claims, 7 Drawing Sheets

(56) References Cited

U.S. PATENT DOCUMENTS

| | | |
|---|---|---|
| 7,420,471 B2 | 9/2008 | Frederick et al. |
| 7,576,657 B2 * | 8/2009 | Duron et al. ............... 340/572.7 |
| 2007/0222609 A1 * | 9/2007 | Duron et al. ............... 340/572.7 |
| 2007/0284446 A1 * | 12/2007 | Ma et al. ...................... 235/451 |
| 2008/0088460 A1 | 4/2008 | Copeland |
| 2008/0137589 A1 | 6/2008 | Barrett |
| 2008/0316029 A1 * | 12/2008 | Hannah et al. ............. 340/568.5 |
| 2012/0013509 A1 * | 1/2012 | Wisherd et al. ............... 342/451 |
| 2012/0027068 A1 * | 2/2012 | Motoyoshi .................... 375/224 |
| 2014/0002302 A1 * | 1/2014 | Robinson, Ian S. ..... 342/357.32 |

* cited by examiner

APPARATUS, A SYSTEM AND A METHOD FOR COLLISION AVOIDANCE

CROSS REFERENCE APPLICATIONS

This application claims priority to U.S. Provisional Patent Application No. 61/323,368 filed 13 Apr. 2010, the contents of which is incorporated herein by reference.

FIELD OF INVENTION

This invention relates generally to collision avoidance, in relation to vehicles, pedestrians and obstacles, and it relates specifically to an apparatus, a system and a method for collision avoidance.

BACKGROUND OF INVENTION

The Inventor is aware that in industrial operations, and particularly mining operations, whether underground or surface mining, collisions involving vehicles, pedestrians and/or obstacles are a problem. These collisions can result in injury or death to the persons involved, damage to property (whether to vehicles or other structures), and at the very least, reduced productivity.

A foot cause of such collisions is poor visibility in mining environments. In underground mining, tunnels or working areas are enclosed by a floor and (usually) a low-hanging roof. There are also typically pillars or supports spaced throughout the working areas. Vehicles need to be relatively flat to fit in and manoeuvre within the working areas, and a vehicle operator typically has a viewpoint of 90° or less. These factors result in very poor visibility from the vehicle cabin.

In surface mining, the vehicles tend to be massive, in order to accommodate a larger payload, and therefore are quite cumbersome. Again, visibility, with respect to objects on the ground (e.g. pedestrians or obstacles) tends to be poor.

The Inventor is further aware that attempts have been made to address these drawbacks. Specifically, RFID (Radio. Frequency Identification) tags can be employed to provide an indication of proximity. However, these tags have a relatively low resolution and may be susceptible to interference. In fact, general prior art systems do not provide satisfactory results due to oversimplification of the detection techniques and/or human notification interfaces.

The Inventor therefore desires an apparatus, a system and a method for collision avoidance, each which is reliable, repeatable and convenient, thereby overcoming or at least alleviating the abovementioned drawbacks.

SUMMARY OF INVENTION

Accordingly, the invention provides a collision avoidance apparatus which includes:
  a UHF (Ultra High Frequency) transceiver operable to send and receive UHF signals in electric field (E-field) mode;
  a VLF (Very Low frequency) transceiver operable to send and receive VLF signals in magnetic field (H-field) mode;
  a SHF (Super High Frequency) transceiver operable to send and receive SHF signals in electric field (E-field) mode;
  a control module operable to direct the operation of the respective transceivers, thereby to:
  detect receipt of a signal via at least one of the transceivers; and
  determine whether or not an alert is to be issued, based on the nature of the received signal; and
  an output arrangement operable to issue an alert in response to instruction from the control module to do so.

The term "transceiver" does not necessarily imply only a single component, but may include discreet transmitter and receiver components.

The term "apparatus" does not necessarily imply a single device, but may comprise a plurality of interconnected devices or components. In fact, the apparatus may allow for modular connection and disconnection of devices of components.

The apparatus may find particular application in a mining environment, although its use is not necessarily limited thereto. The apparatus may find applications specifically in underground and/or surface mining. In fact, in one embodiment, an advantage of the apparatus is that it can transition between underground and surface mining operations with little or no disruption in functionality.

The control module, by detecting receipt of a signal via at least one of the transceivers, may be operable to determine that another signal-transmitting apparatus (i.e. a second apparatus which may be similar or identical to the present apparatus), and hence an object associated with the second apparatus, is proximate (e.g. within communication range). Thus, the apparatus may be used in a system including a plurality of identical or similar apparatus, each able to detect receipt of signals from other, proximate apparatus.

The control module may be operable to determine or at least estimate a distance of the second, proximate apparatus (and therefore its associated object) by analysing the characteristics of the received signal(s).

The control module may be configured to define a plurality of proximity zones. The control module may further be configured to categorise/classify the second apparatus as being in one of the plurality of proximity zones, based on the estimated distance to the second apparatus. The control module may include a different alert associated with each proximity zone. The control module may then be configured to raise one of a plurality of alerts, depending on the proximity zone into which the second apparatus has been categorised. The control module may be operable dynamically to adjust the dimensions, or boundaries of the respective proximity zones.

Each transmission technology (i.e. UHF, VLF and SHF) may have its own particular advantages and disadvantages (described further below). However, the combination of at least these specific three technologies allow for the disadvantages of each to be compensated for by the advantages of the others. They therefore function and interact synergistically and many of the advantages are cumulative.

The UHF transceiver (or digital antenna) may be operable to receive and to generate and transmit UHF data packets of short burst duration. The control module may be configured to approximate a distance from the second apparatus based on a strength of a UHF signal received from the second apparatus. The communication range of the UHF transceiver may be up to 100 m. (1 m≈3.28 ft.) In fact, depending on the specific configuration of the UHF transceiver, the range may exceed 100 m. The control module may be capable of determining the distance of a second (proximate) apparatus with a resolution of approximately 15 m. Thus, UHF communication has the advantage of being long range, but has the disadvantage of having a low resolution (and hence a low accuracy).

The VLF transceiver (or electromagnetic antenna) may be operable to send and receive H-field based signals a distance of up to 15 m (of more). The control module may then be operable to resolve signals received by the VLF transceiver with a resolution of 1 m. Although the distance is relatively small and the resolution is good to average, this H-field signal is impervious or at least resistant to obstructions and other adverse environmental operating conditions.

The VLF transceiver may be configured (whether autonomously of under direction of the control module) automatically to adjust its transmission frequency marginally to compensate, for de-tuning effects of large collocated ferrous metal structures presented by the object associated with, and therefore, adjacent, the present apparatus.

The SHF transceiver (or radar antenna) may be operable to transmit and receive SHF data packets in rapid succession. The SHF signal typically has a range of between 5 m and 50 m. The "time of flight" of the SHF signal varies depending on the distance between transmitter and receiver, and by measuring minuscule differences in the time of flight of the signal, the SHF transceiver can provide resolution in the order of 0.5 m. Thus; using the SHF technology, good distance and excellent accuracy can be obtained. However, a drawback of this technology is that the SHF signal is easily compromised by adverse environmental operating conditions or obstructions.

The control module may be operable to calibrate the VLF transceiver based on transmission received from the SHF transceiver. By way of explanation, the VLF transceiver is susceptible to detuning or interference from its surroundings. For example, if it is installed within a vehicle, the vehicle itself may affect the magnetic field. Thus, using the accurate readings from the SHF transceiver, the VLF transceiver can be calibrated to compensate for any de-tuning effects associated with the installation of apparatus. This calibration may be done on installation and/or periodically, e.g. as part of routine maintenance.

The apparatus may include a GPS (Geographic Positioning System) module operable to determine the GPS coordinates of the object with which the apparatus is associated. In conventional fashion, the control module may be operable to use the GPS coordinates also to determine a speed and direction of the object, if mobile. The GPS module may be applicable only to apparatus used in surface mining, as GPS signals may struggle to reach underground apparatus.

The apparatus may include a motion detector operable to measure instantaneous angular velocity, instantaneous 3-axis acceleration/deceleration, instantaneous speed and/or motion status detection.

The apparatus may include a video capture device such as a camera operable to capture and/or display video. The apparatus may include a plurality of video capture devices nearby to display to an operator a plurality of videos each showing a view in a different direction. The video capture devices may be spaced around cardinal points of the object.

The respective components, devices, modules, and the like, of the apparatus may be interconnected using a "power+serial communication+balanced data" cable as per the defined BNET proprietary standard.

There may be four defined proximity zones. The zones may be generally concentric, radiating outwardly from the apparatus. A first, innermost zone; may be defined as a critical zone and may have a radius from approximately 0 m to 5 m. A second zone may be defined as a warning zone and may have a radius of approximately 5 m to 12.5 m. A third zone may be defined as a caution zone and may have a radius of approximately 12.5 m to 100 m. A fourth zone may have a radius of greater than 100 m and may be defined as a safe zone. The alerts may be dependent upon the zone which the second apparatus is determined to be in, as well as the specific configuration of the present apparatus. The dimensions of the respective proximity zones may be configurable or adjustable on-the-fly depending on certain operational criteria.

The specific configuration of the apparatus may vary depending on the object with which it is intended to be associated. The Inventor envisions at least three distinct embodiments:

a personnel apparatus (intended to be worn or carried on a person);

a vehicle apparatus (intended to be installed or mounted in a vehicle); and an obstacle apparatus (intended to be attached to fixed obstacles).

The vehicle apparatus may include a plurality of VLF transceivers at locations around the vehicle to which the vehicle apparatus is mounted or installed. Each VLF transceiver may have a unique ID associated therewith. The VLF transceivers may be spaced at cardinal points around the vehicle which may be important for avoiding collisions with all portions of the vehicle, especially in larger vehicles. The vehicle apparatus may include an additional VLF transceiver within the cabin of the vehicle thereby to detect that an operator of the vehicle has about his person a personnel apparatus. Thus, the control module of the vehicle apparatus may be configured to disregard signals received from a personnel apparatus if it is determined that the personnel apparatus is within the cabin of the vehicle and not outside the vehicle. In this fashion, signal sent from the personnel device of the vehicle operator will not hamper the operation of the vehicle.

The output arrangement may be in the form an acoustic transducer, such as a loudspeaker or buzzer. The specific type of alert which is issued from the loudspeaker may be controlled by the control module. For example, if it is detected that the nearest second apparatus to the vehicle apparatus is in the safe zone (e.g. further than 100 m), the control module may issue no alert. For the following zones, the control module may direct that an alert is raised as follows:

caution zone: increasingly repetitive pulsed beep;
warning zone: dipped beep; and
critical zone: continuous beep.

The control module may be operable to issue voice alerts, or voice annunciation via the acoustic transducer.

In one embodiment, the vehicle apparatus may be connected to a control system of the vehicle, for example by means of a CAN (Controller Area Network) bus connected to a CAN vehicle engine management bus. This connection may allow the vehicle apparatus to receive information about the vehicle. This connection may also allow the vehicle apparatus to direct the operation of the vehicle. For example, the control module may be configured to stop or brake the vehicle in response to detection of an emergency situation, for example detection of a second apparatus within the critical zone.

The vehicle apparatus may be powered by the electrical system of the vehicle.

The vehicle apparatus may include a display arrangement. The display arrangement may function as the output arrangement; and/or as a user interface. Depending on the specific configuration of the vehicle apparatus, the display arrangement may take different forms. The control module and the display arrangement may be integrated in one device or may be separate but interconnected devices.

At least four different display configurations are contemplated:

light emitter only integrated with control module: configured to be mounted in the cabin and to flash in response to detection of a proximate second apparatus;

an advanced display integrated with control module: configured to be mounted in the cabin and to indicate cardinal threat direction and includes a loudspeaker;

an advanced display separate from the control module: the control module may be mounted in the engine compartment or other discreet location; and an advanced display, including video support, separate from the control module: the display is operable to display video streams captured by cameras.

In fact, the display configuration may appear similar the that of GPS devices or SatNav apparatus, having a graphical aspect indicating the vehicle and its surroundings, and voice prompt aspect, to provide verbal information to the driver.

The personnel apparatus may be connected to, or integrated with, standard mining equipment routinely worn by raining personnel. An example of such mining equipment is a cap lamp and battery pack, and the personnel apparatus may therefore be integrated with this cap lamp and battery pack.

Advantageously, the output arrangement may be in the form of, or at least may include, the cap lamp. Thus, the control module may direct the operation of the cap lamp to indicate the proximity of a second apparatus, for example by varying the intensity of the cap lamp.

Instead, or in addition, the output arrangement may be in the form of another light emitter, such as a laser LED module and/or an acoustic transducer. The output arrangement may include a tactile device, such as a vibration motor similar to those used in cellular telephones, to deliver the alert in an alternative form.

The personnel apparatus may include an input arrangement, for example in the form of a non-latching pushbutton, operable to receive an emergency input. In response to receipt of the emergency input, the control module may direct at least one of the transceivers to send an emergency signal directing proximate vehicles to stop or brake.

The personnel apparatus may be configured to ignore certain classes of proximate apparatus, such as other personnel apparatus, and only to respond to other classes of apparatus, such as vehicle apparatus.

The obstacle apparatus may include and be powered by an internal power source, such as a lithium battery. The obstacle apparatus may be installed at any appropriate locations and may be configured to perform at least one of the following tasks:

transmit self-test signal: this will force any proximate vehicle apparatus to perform a self-test sequence recognisable by the vehicle operator;

transmit disable signal: this will force any proximate apparatus to cease functioning, which may be useful for example in an underground workshop;

transmit learn all signal: this will direct any proximate vehicle; apparatus to place all other, apparatus currently proximate the vehicle apparatus on an exception list so that they are ignored until they are removed and then reappear;

transmit learn vehicles signal: this will direct any proximate personnel apparatus to place all vehicle apparatus currently proximate that personnel apparatus on an exception list so that they are ignored until they are removed and then reappear;

transmit disable/enable audio alarm signal: this is used to disable/enable audio alarms temporarily in proximate vehicle apparatus which may be distracting to a vehicle operator; and transmit hazard notification signal: this is used to notify proximate apparatus that they are in close proximity to a hazardous area, such as an unsupported underground roof.

It is to be appreciated that the list of above tasks is not necessarily exhaustive and further tasks could be added, as desired.

The control module may include a processor and computer-readable medium having stored thereon a set of instructions, e.g. a computer program, configured to direct the operation of the control module, and hence of the apparatus, when executed by the processor. Differently stated, the control module may be a conceptual module corresponding to functional tasks performed by the processor executing the computer program. It is to be understood that the processor may be one or more microprocessors, controllers, digital signal processors (DSPs), or any other suitable computing device, resource, hardware, software, or embedded logic.

The invention extends to a system for collision avoidance, the system including:

at least two apparatus as defined above.

More particularly, the system may include at least one personnel apparatus and at least one vehicle apparatus.

The system may further include conventional RFID tag assemblies, e.g. active of self-powered RFID tags, or passive RFID tags.

The invention extends to a method of collision avoidance, the method including:

sending and receiving UHF signals in electric field (E-field) mode using a UHF transceiver;

sending and receiving VLF signals in magnetic field (H-field) mode using a VLF transceiver;

sending and receiving SHF signals in electric field (E-field) mode using a SHF transceiver;

directing the operation of the respective transceivers by means of a control module, thereby to:

detect receipt of a signal via at least one of the transceivers; and determine whether or not an alert is to be issued; and issuing, via an output arrangement, an alert in response to instruction from the control module to do so.

The method may include determining, upon detecting receipt of a signal via at least one of the transceivers, that another signal-transmitting apparatus (i.e. a second apparatus), and hence an object associated with the second apparatus, is proximate (e.g. within communication range).

The method may include determining or estimating a distance to the second apparatus, based on the received signals.

The method may include defining a plurality of proximity zones and classifying the second apparatus in one of the zones, based on its distance. The method may include raising an alert depending on a specific zone in which the second apparatus is detected. The method may include dynamically varying a size of the proximity zones based on operational criteria.

The method may include directing automatically the operation of a vehicle in accordance with signals detected by a vehicle apparatus associated with that vehicle.

The method may make use of an apparatus as defined above.

The invention extends still, further to a computer-readable medium having stored thereon a computer program which, when executed by a processor, is operable to implement the method defined above.

BRIEF DESCRIPTION OF DRAWINGS

The invention will now be further described, by way of non-limiting example, with reference to the accompanying diagrammatic drawings.

In the drawings.

DETAILED DESCRIPTION OF EXAMPLE EMBODIMENT

Figure 1:
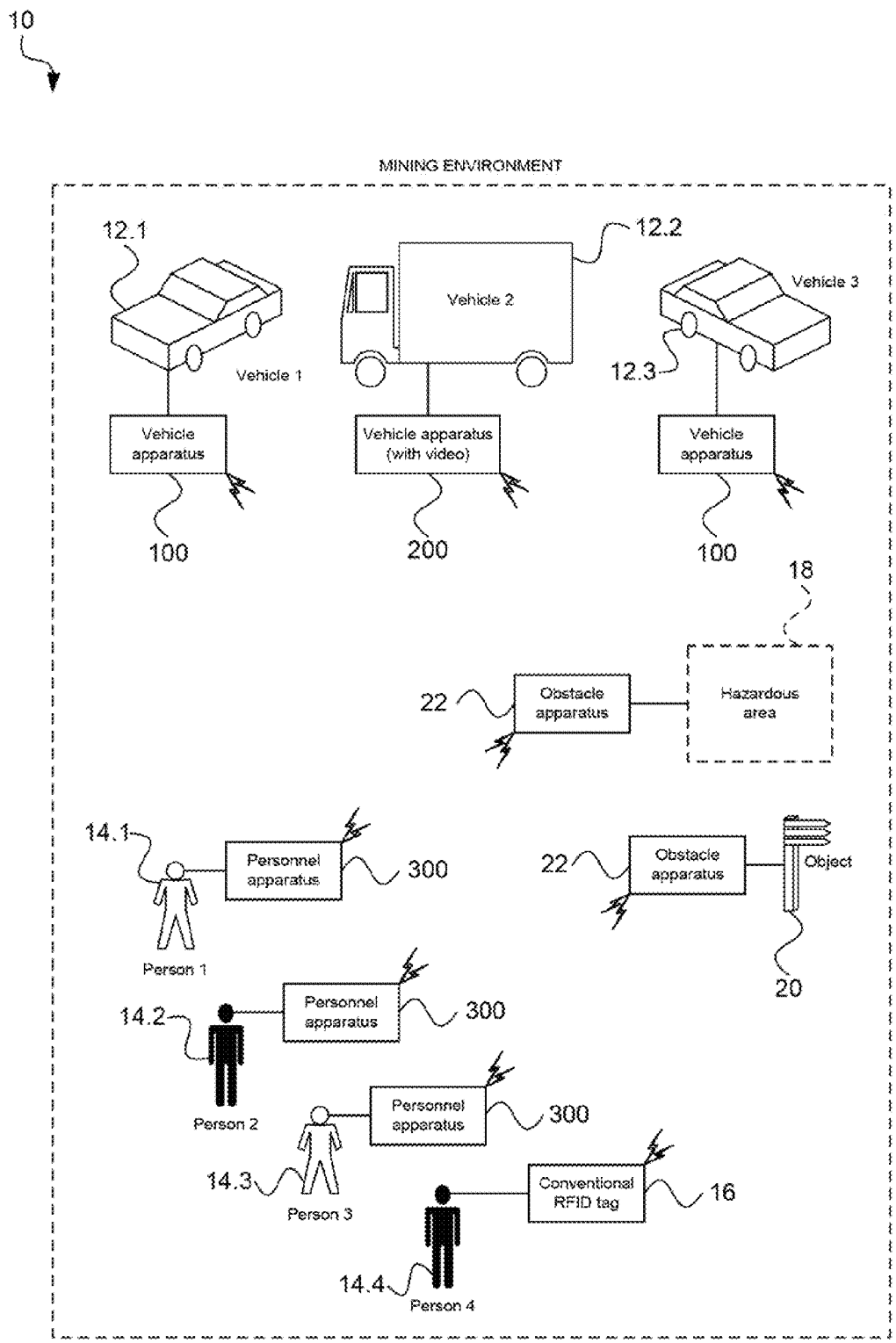
FIG. 1 shows a schematic view of a system for collision avoidance, in accordance with the invention.

Referring initially to FIG. 1, reference numeral 10 generally indicates a system for collision avoidance, in accordance with the invention. Although this example embodiment is described with reference to a mining environment, it is to be appreciated that the apparatus, system and method in accordance with the invention may well be applicable to other environments or situations. The problem of collisions is particularly serious in mining environments due to the following factors: personnel (e.g. miners) and vehicles (e.g. trucks and mining machines) working in common areas, massive size of vehicles, reduced visibility, etc. Such collisions can lead to downtime, damage to equipment, injury, and in severe cases, loss of life.

Also, the mining environment can include aspects of both underground mining and surface mining. The system 10 is not only applicable to both, but can in fact transition from one to the other.

The system 10 includes a plurality of vehicles 12. Only three vehicles 12.1, 12.2, 12.3 are illustrated, but it is to be appreciated that there may be many more vehicles of various shape and form. Further, the term "vehicles" includes haulage devices, mining machines such as drillers/bolters, and the like.

The system 10 includes a plurality of apparatus 100, 200, 300, 22 in accordance with the invention. The apparatus 100, 200, 300, 22 are classified according to the object to which they are to be attached or connected, and in this example they are classified as a vehicle apparatus 100, 200, personnel apparatus 300, and an obstacle apparatus 22. The system 10 can also include, if desired, conventional transceivers such as conventional RFID tags 16. While these RFID tags 16 are currently available and do not in themselves constitute part of the invention, they may be operable to inter-communicate with other apparatus 100, 200, 300, 22.

Figure 2:
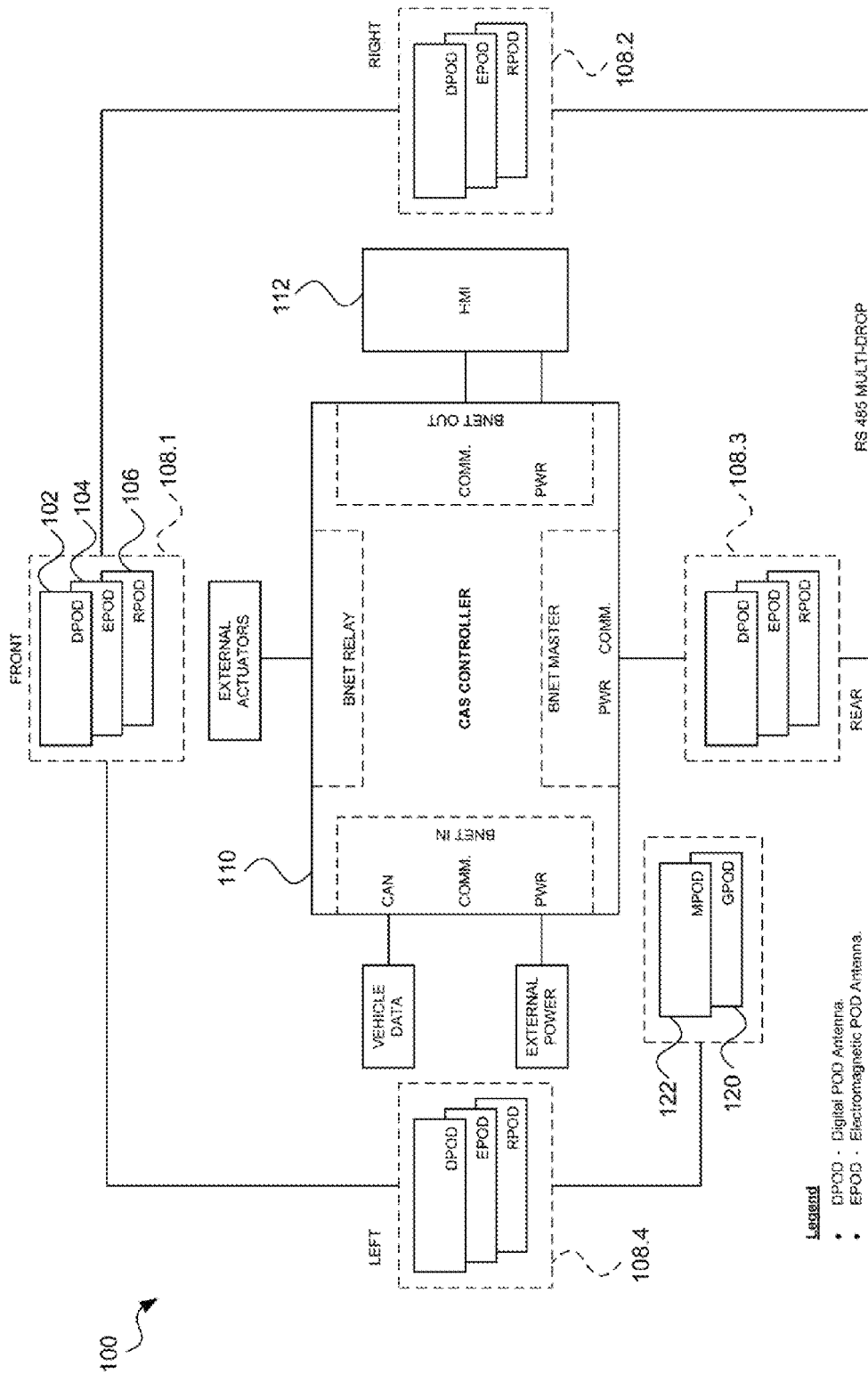
FIGS. 2 to 4 each show schematic views of respective collision avoidance apparatus, in accordance with the invention.
Figure 3:
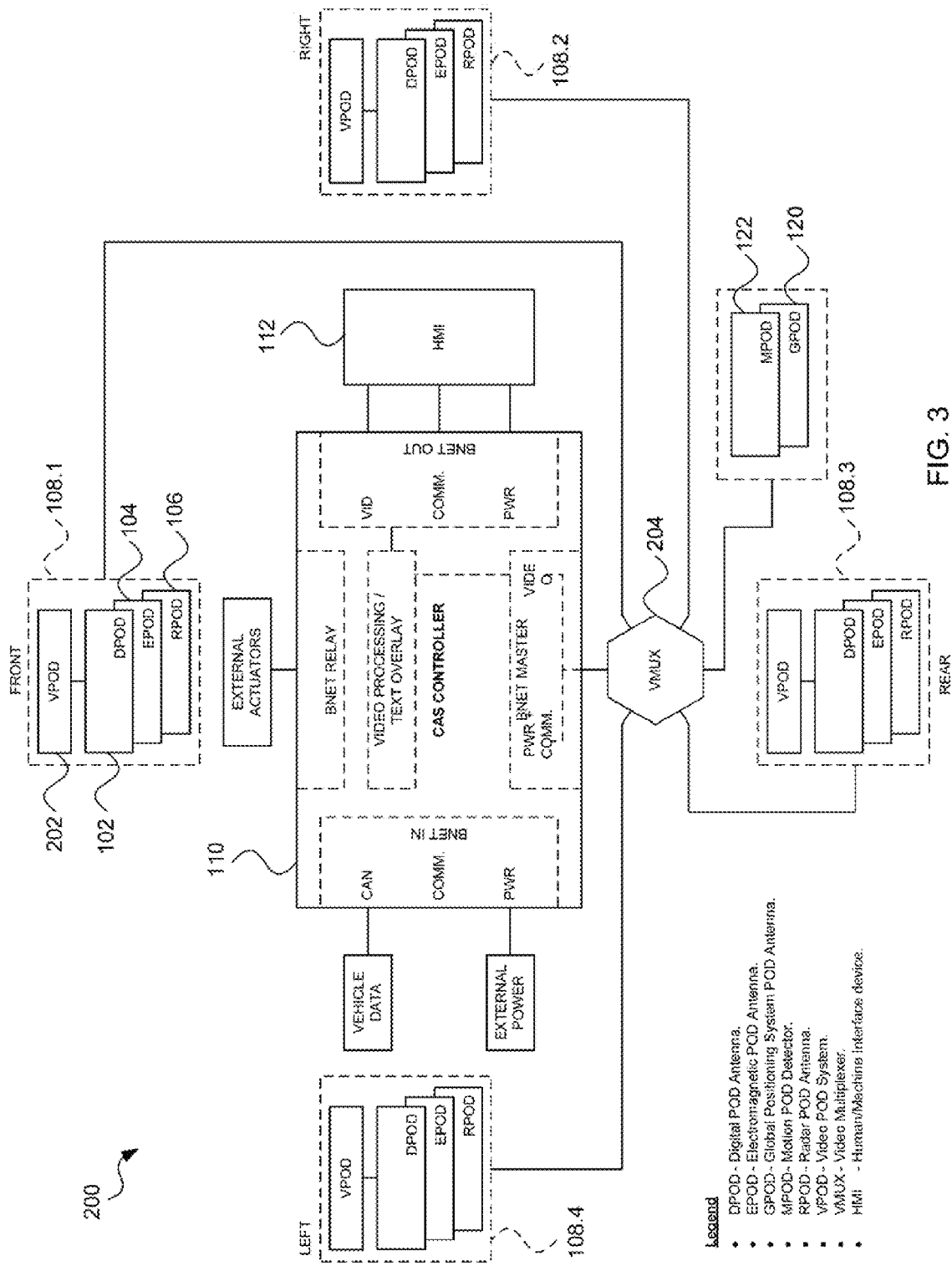

In accordance with the invention, each vehicle 12 has attached thereto either a vehicle apparatus 100 (refer to FIG. 2) or a vehicle apparatus (with video) 200 (refer to FIG. 3). Each apparatus 100, 200 includes at least a plurality of transceivers, a control module, and an output arrangement (described further below). The exact manner in which the vehicle apparatus 100, 200 is attached to the vehicles 12 may vary depending on the situation, but in this example, the vehicle apparatus 100, 200 are configured to be retrofittable to existing vehicles 12. Thus, vehicles 12 can be manufactured in conventional fashion and the desired apparatus 100, 200 can simply be fitted or installed when required.

It is common for a plurality of persons 14 (e.g. mining personnel) to be in the same environment simultaneously as the vehicles 12. In such case, the persons 14 are fitted with personnel apparatus 300 (refer further to FIG. 4). Like the vehicle apparatus 100, 200, each personnel apparatus 300 includes at least a plurality of transceivers, a control module, and an output arrangement (described further below).

While many passive transponders (e.g. passive RFID tags) exist, an inherent limitation is that these transponders rely on an energising interrogating signal for power, and have a short range compared to active, or self-powered, transponders/transceivers. Accordingly, the personnel apparatus 300 in this example are actively powered by means of a battery. Advantageously, the personnel apparatus 300 are integrated with existing equipment which persons in the mining area are required to wear about their person, e.g. a cap lamp and battery pack. The personnel apparatus 300 may use the battery pack as a power source, and may even use the cap lamp as part of the output arrangement.

Each of the apparatus 100, 200, 300, 22 includes at least the following transceivers:

a UHF transceiver operable to send and receive UHF signals in electric; field (E-field) mode;

a VLF transceiver operable to send and receive VLF signals in magnetic field (H-field) mode; and a SHF transceiver operable to send and receive SHF signals in electric field (E-field) mode.

The apparatus 100, 200, 300 may include additional transceivers, as described below, depending on the particular desired configuration;

"Stripped down" versions of the personnel apparatus 16, including only a conventional UHF transceiver, may also form part of the system 10.

An optional extra apparatus in this example is an obstacle apparatus 22, which may be attached to any obstacles or objects, other than vehicles 12 and persons 14. Examples of such objects include hazardous areas 18 (e.g. unsupported ground) or posts, pillars, and general obstacles 20. The obstacle apparatus 22 includes some or all of the components of the vehicle or personnel apparatus 100, 200, 300.

Figure 4:
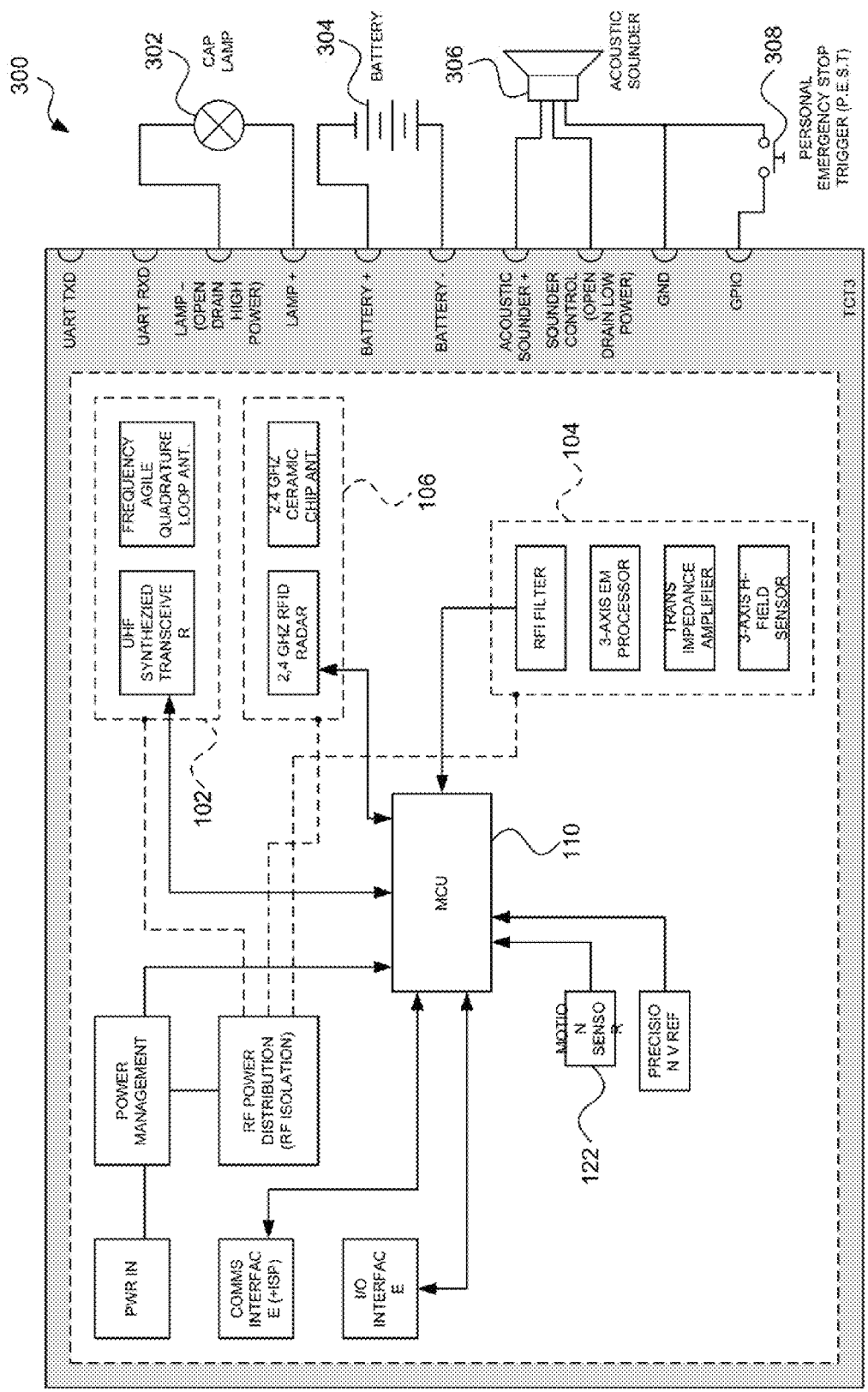

The functionality of the respective apparatus will become clearer when described with respect to FIGS. 2 to 4.

FIG. 2 illustrates an example embodiment of the vehicle apparatus 100. The various transceivers/antennas have been dubbed "RODS" for ease of reference and to imply a vessel enclosure comprising electronic components interconnected by power and communication cables.

The vehicle apparatus 100 includes a UHF transceiver having a digital antenna ("DPOD") 102. The DPOD 102 is operable to detect RFID transmissions from similar DPOD transmitters of other proximate apparatus (whether vehicle apparatus 100, 200, personnel apparatus 300, conventional RFID tags/transponders 16, etc.) and to transmit UHF data packets of short burst duration. These UHF packets advantageously include a unique ID associated with the vehicle 12 to which the vehicle apparatus 100 is attached.

The vehicle apparatus 100 also has a VLF transceiver; having an electromagnetic antenna ("EPOD") 104 operable to communicate by sending and receiving magnetic field, signals, which are the most impervious with respect to barriers and/or obstructions. The vehicle apparatus 100 further has a SHF transceiver or radar antenna ("RPOD") 106. By measuring the time of flight of the transmission of the SHF signal between targets, a relatively accurate estimation can be established of the distance between the present vehicle apparatus 100 and a proximate apparatus. It should be noted that the RPOD 106 can send and receive information.

In this example, there are a plurality of PODs 102, 104, 106 arranged in groups or banks 108 and located at cardinal points on the vehicle 12, i.e. front 108.1, right 108.2, rear 108.3 and left 108.4. There could be more or less groups 108, depending on the vehicle 12 and the operating conditions. The vehicle apparatus 100 may therefore be able to determine not only a distance to a proximate, second apparatus, but also a direction, based on received signal strengths from respective groups 108.

Importantly, the vehicle apparatus includes a control module 110 (labelled "CAS controller", standing for Collision Avoidance System controller). Although not specifically illustrated, the control module 110 includes a processor and a computer-readable medium having stored thereon a computer program operable to direct the operation of the processor. The processor executing the computer program thus embodies the control module 110 which is responsible for providing much of the functionality of the vehicle apparatus 100.

The vehicle apparatus 100 includes a human-machine interface (HMI) 112 which also functions as an output arrangement operable to issue an alert in response to instruction from the control module 110 to do so. The HMI 112 includes at least an audio transducer in the form of a loudspeaker or buzzer operable to emit beeps or other audible alert (e.g. voice annunciation messages). If desired, the HMI 112 could also, include a visual indicator (e.g. a display) to indicate, for instance, a direction of the proximate apparatus. In this example, the HMI 112 is also operable to receive user inputs, e.g. by way of an iButton, a touch screen, etc. Thus, the HMI 112 facilitates two-way communication: output from the control module 110 to the operator and input from the operator to the control module 110.

As optional extras, the vehicle apparatus 100 includes a GPS module ("GPOD") 120 and a motion detector ("MPOD") 122. The GPOD 120 is used to measure GPS coordinates of the vehicle 12 while on the surface or in range of GPS satellites. Direction vectors can be calculated and reported to assist in determining a position of the vehicle 12 thereby to increase the efficiency of preventing collisions. The MPOD 122 is operable to measure instantaneous angular velocity, 3-axis acceleration, speed and motion status. These parameters are useful in reducing false alarms as well as improving the response when used together with readings from the GPOD 120.

Figure 5:
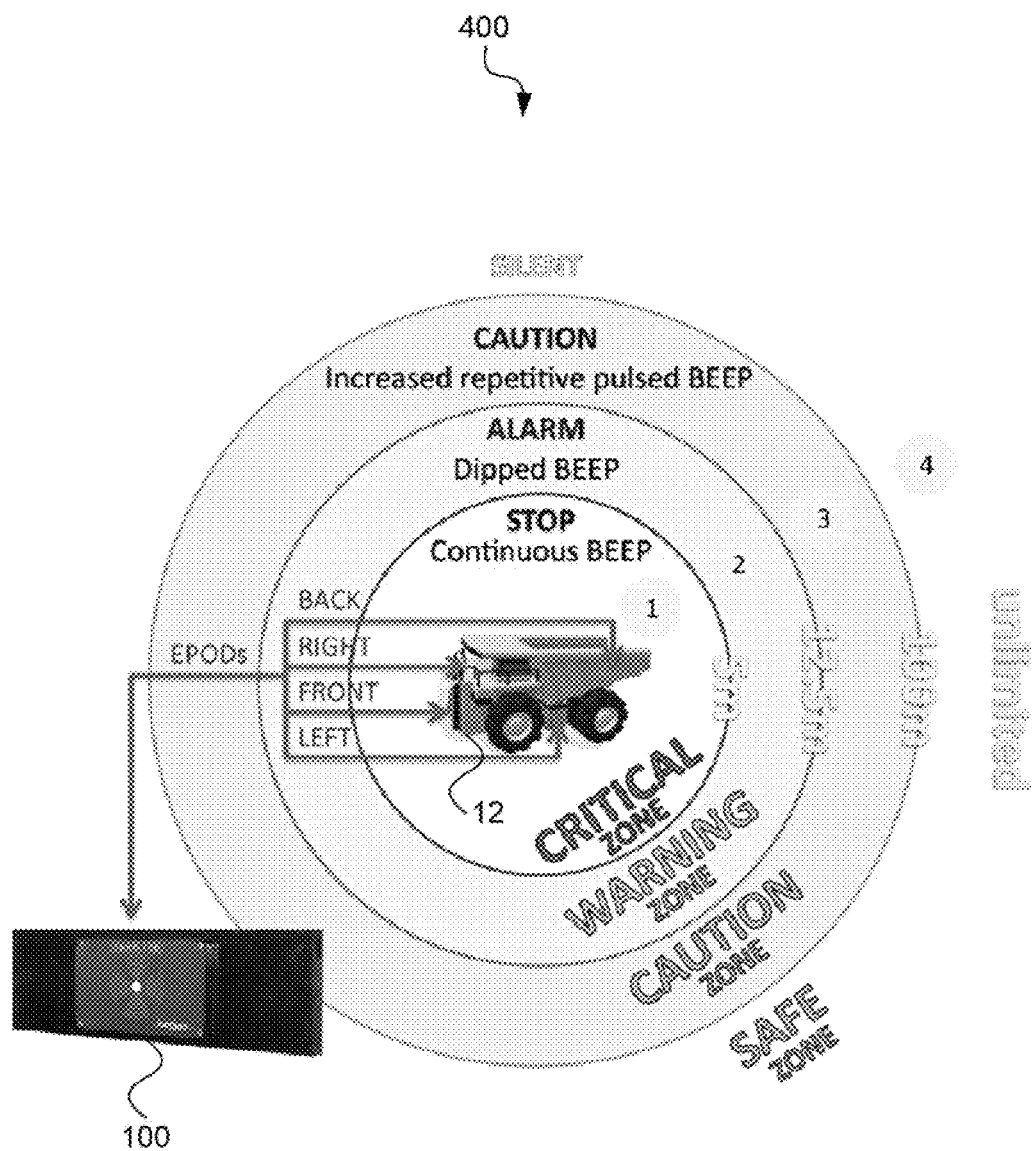
FIG. 5 shows a schematic view of a plurality of proximity zones employed by the apparatus of FIGS. 2 to 4.

An important feature of the apparatus 160 is that the control module 110 is configured to define a plurality of proximity zones 400 (refer to FIG. 5) around the vehicle apparatus 100 or around the vehicle 12 itself. The exact naming convention of the proximity zones 400 is hot of importance, but the action taken by the control module 110 in response to detection of a second apparatus in one of the proximity zones 400 varies. Also, the control module 110 is operable dynamically to adjust the size of the proximity zones 400 based on operational criteria.

If the vehicle 12 is a slow moving vehicle (e.g. with a maximum speed of 10 km/h), the proximity zones 400 may be configured as follows:

| Zone | Label | Size | Alarm | Other action |
|---|---|---|---|---|
| Zone 1 | Critical zone | 0 m to 5 m | Continuous beep | Force vehicle to stop |
| Zone 2 | Warning zone | 5 m to 12.5 m | Dipped beep | Intense warning |
| Zone 3 | Caution zone | 12.5 m to 100 m | Increasing pulsed beep | Gentle warning |
| Zone 4 | Safety zone | 100 m+ | Silent | No action |

The control module 110 is operable to vary the sizes of the proximity zones 400 based on one or more of the following criteria:

motion status of the apparatus 100 and hence of the vehicle 12, e.g. a binary value of moving or not moving, as determined by the MPOD 122 in isolation and/or with reference to the motion status of a proximate apparatus;

speed of the vehicle 12, in isolation and/or with reference to the speed of a proximate apparatus;

collision vector, or "distance-to-collision", based on GPS measurements by the GPOD 120;

the type of vehicle 12, e.g. maximum speed, length and/or or width; or status of engine and power train of the vehicle 12, based on CAN bus information.

It is to be understood that the proximity zones 400 are, not necessarily circular or uniform. For example, if the vehicle 12 is moving forward, a proximity zone, such as the critical zone, can be extended forward, thereby having a cone or wedge shape.

The control module 110 includes a plurality of connection interfaces in accordance with the BNET standard, including:

BNET IN: Receives communication and power from previous BNET CAS device;

BNET OUT: Transmits communication and power to next BNET CAS device;

BNET MASTER: Initiates BNET daisy chain connection to multiple CAS devices in series; and BNET RELAY: Provides potential free relay contacts and open collector GPIO lines, which is used for example for stopping vehicles and disabling ignition switches.

Accordingly, it may be possible to connect in series or cascade a plurality of vehicle apparatus 100.

Further, BNET facilitates the following types of communication and power interconnectivity between devices constituting typical installations of vehicle apparatus 100:

CAN Bus: For interfacing with vehicles CAN vehicular information bus;

RS485 Bus: For communication between CAS devices around the vehicle;

Power: To carry DC power to all CAS devices connected on the vehicle;

Differential Video: To carry video images between CAS devices;

USB: To allow PC/Notebook/Netbook connectivity into CAS system for control monitoring and configuration purposes; and Differential Audio: To carry audio annunciation messages between GAS; devices.

Thus, the vehicle apparatus 100 has the ability to connect to ah existing CAN vehicle engine management bus in order to allow the control module 110 to make more informed decisions regarding potential collisions.

Referring now to FIG. 3, the vehicle apparatus 200 is similar to the vehicle apparatus 100, with the most notable difference in that it includes video capabilities. The same reference numerals refer to identical or similar parts.

The vehicle apparatus 200 includes a plurality of video capture devices, such as cameras, referred to as "VPODs" 202, in each group 108. To accommodate these VPODs 202, the vehicle apparatus 200 also includes a video multiplexer "VMUX" 204 to coordinate and process the inputs from the respective VPODs 202.

The addition of video capabilities necessitates a more advanced HMI 112 which includes a display screen, or a plurality of display screens, operable to display video images captured from one of, or a plurality of, the VPODs 202.

FIG. 4 shows a personnel apparatus 300. In this example, the personnel apparatus 300 is integrated with a conventional cap lamp apparatus, which includes a cap lamp 302 and a battery pack 306.

The personnel apparatus 300 includes transceivers 102, 104, 106 similar to those of the vehicle apparatus 100, 200. The personnel apparatus 300 also includes a control module 110 (labelled as "MCU") and an optional motion sensor 122 to detect whether or not the person 14 is moving.

The personnel apparatus 300 further includes an; acoustic transducer 304 and a pushbutton 308. The cap lamp 302 and the transducer 306 serve as the output arrangement. Depending on the proximity zone 400 in which the control module 110 determines a proximate apparatus to be, the control module 110 will sound the acoustic transducer 306 and vary the intensity of the cap lamp 302 (but not turn it off altogether).

A further feature of the personnel apparatus 300 is the provision of the pushbutton 308 which is operable to receive an emergency input, in response to which the control module 110 sends an emergency signal to all proximate vehicle apparatus 100, 200 directing them to stop or brake their associated vehicles 12.

Figure 6:
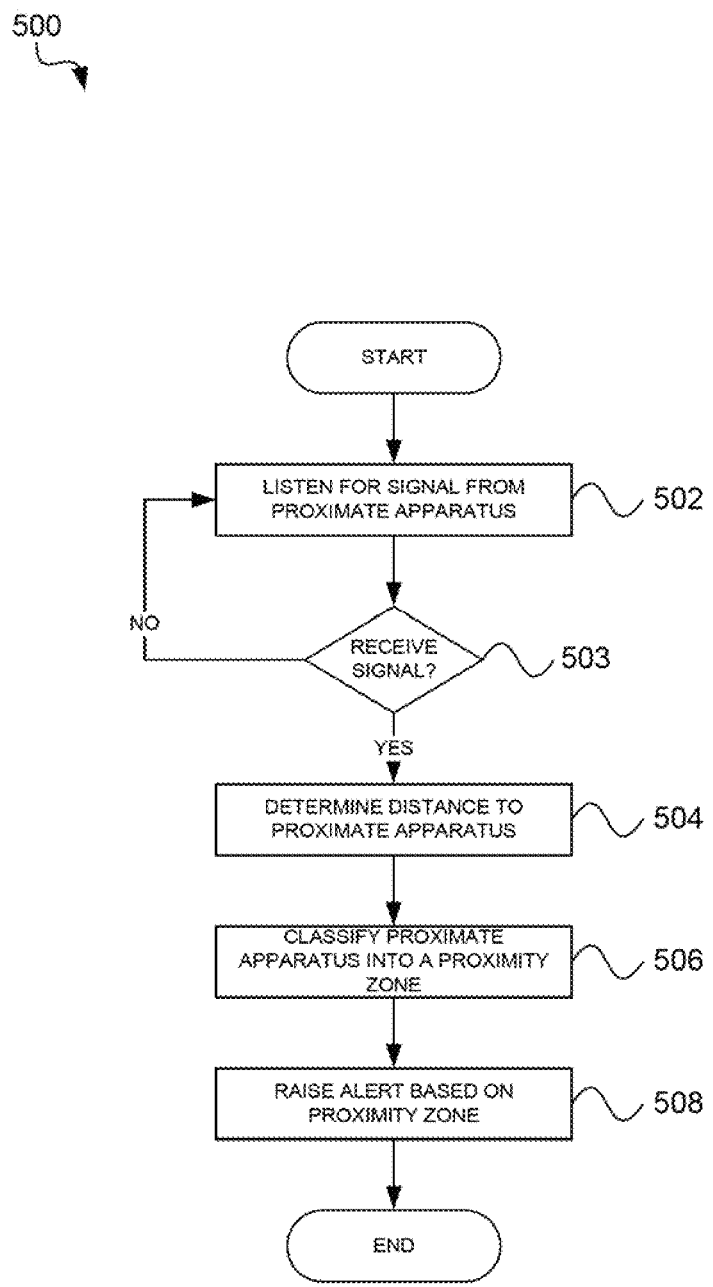
FIG. 6 shows a flow diagram of a method of collision avoidance, in accordance with the invention.

The invention will be further described in use with reference to a practical example and with reference to FIG. 6, which illustrates a flow diagram of a method 500 in accordance with the invention. The method 500 may be applicable to both the vehicle apparatus 100, 200 and to the personnel apparatus 300, although it is to be appreciated that the apparatus 100, 200, 300 may be configured to perform different methods (not illustrated).

In this practical example, a vehicle apparatus 100 has been retrofitted to an existing mining vehicle 12, with groups 108 of transceivers 102, 104, 106 located at four cardinal spatial points around the vehicle 12. As the installation may affect the calibration of the EPOD 104, a reference reading is obtained using the RPOD 106 which is very accurate and which is used to calibrate the EPOD 104. The EPOD 104 can then receive signals accurately where the other PODs 102; 106 may not, e.g. through rock. This calibration (as well as other maintenance) is also performed at periodic service intervals.

A miner 14 is outfitted with a personnel apparatus 300 integrated into his existing cap lamp apparatus.

Both the vehicle 12 and the miner 14 are working underground in a mining environment. In this environment, visibility is reduced due to lack of natural light and obstacles, while audible communication is also reduced due to ambient mining noises.

The UHF transceiver 102 of the personnel apparatus 300 is continually listening for (or receptive to), at block 502, signals or transmissions from the vehicle apparatus 100 while similarly the DPOD 102 of the vehicle apparatus is continually listening, also at block 502, for active transmissions from both personnel apparatus 300 and other vehicle apparatus 100, 200. The personnel apparatus 300 need not be configured to be responsive to communications from other personnel apparatus 300 as collisions between miners 14 themselves tend to be minor. All apparatus 100, 200, 300 are encoded with unique addresses within the system 10, and the control modules 110 can make collision risk decisions based on the priority of a detection system for a given installation.

These bi-directional transmissions are taking place continually at regular pseudo random intervals, for example having an average period of 500 ms but not exceeding 800 ms. A network of packet data interchange can therefore be established between all targets within UHF radio range of each other. In addition, this UHF data interchange network can be used to communicate data, such as values of GPS direction vectors (when on surface) and EPOD 104 3-axis signal strengths (when underground).

Initially, while the vehicle 12 and the miner 14 are far apart, no signals will be detected and it will be business as usual. In other words, the vehicle 12 and the miner 14 will be in the safe proximity zone (zone 4) relative to each other.

If the vehicle 12 and the miner 14 approach each other, at some point they will cross the border of the safe proximity zone into the caution proximity zone (zone 3). At this point, the respective transmitted signals will begin to be received, at block 503, by both proximate apparatus 100, 300. At first, it will be only the longest range (i.e. UHF) signal which is received.

If both apparatus 100, 300 include GPS modules (e.g. a GPOD 120), GPS vectors can be interchanged, and this becomes the preferred method of calculating the potential for collision between two vehicles 12, or one vehicle 12 and one person 14. In this example, however, the personnel apparatus 300 does not include a GPS module and therefore one GPS direction vector (bearing) will be missing.

The control modules 110 will then evaluate the longest range, detection system (UHF as provisioned by the DPODs 102) to determine proximity based on UHF received signal strength. The control module 110 of each apparatus 100, 300 determines, at block 504, a distance to the other, proximate apparatus 100, 300 by analysing the strength of the received signal. In this case, the UHF signal will be relatively weak and the control modules 110 will therefore classify, at block 506, the proximate apparatus 100, 300, and hence the vehicle 12 and miner 14 with which they are associated, into the relevant proximity zone 400, which in this case is the caution proximity zone.

An appropriate alert is then raised, at block 508, by the control module 110 of each of the apparatus 100, 300.

As the vehicle 12 and the miner 14 approach, the other transceivers 104, 106 come within communication range of each other. Simultaneous decision trees based on RFID Radar and Electromagnetic measurements from the EPOD 104 and the RPOD 106 of the vehicle apparatus 100 communicating with the similar transceivers 104, 106 of the personnel apparatus 300 cause further decisions to be made by the control modules 110 with regard to the potential of a collision. The absence, or failure, of one of the detection mechanisms is catered for in a decision matrix programmed into the control module 110, so as to provide for a best case fall-back mechanism.

Ultimately, the proximity of the vehicle 12 and the miner 14 are continuously reported to the machine/vehicle operator in the context of caution, warning or critical.

If the vehicle 12 becomes critically close (i.e. less than 5 m) to the miner 14, the control module 110 of the vehicle apparatus 100 is operable to stop the vehicle 12 thereby automatically to prevent a collision.

Also, if the miner 14 observes that the vehicle 12 is heading towards him, or towards some other potentially vulnerable or hazardous object, the miner 14 presses the pushbutton 308 in response to which the control module 110 transmits an emergency signal, commanding all vehicles 12 within range to stop.

Generally, however, the activities of mining can be, carried on with general alerts and notifications regarding the proximity of vehicles 12, miners 14, and other objects 18, 20.

Figure 7:
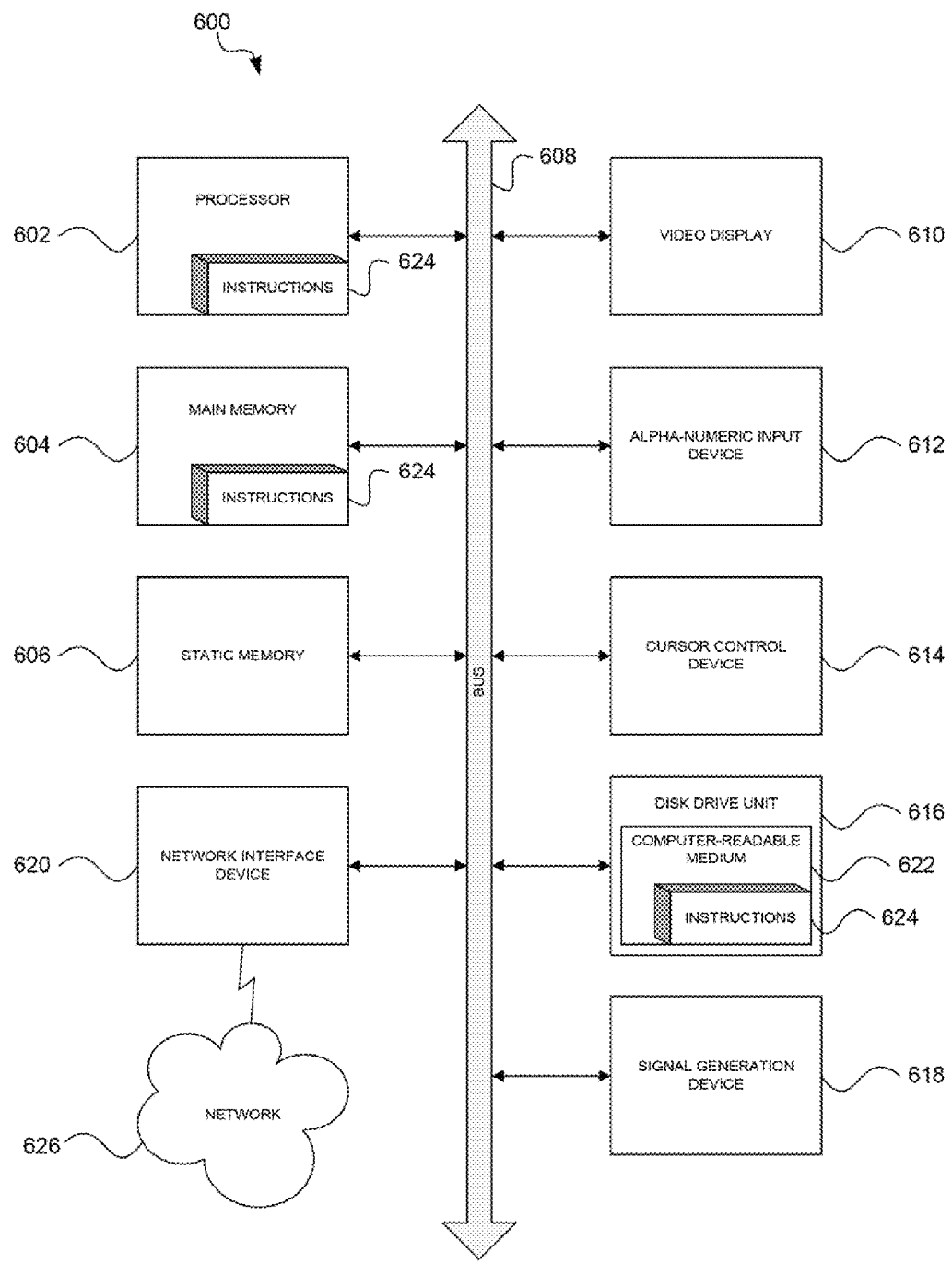
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone; a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), a digital signal processor (DSP), of any combination of these processors, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation, device 614 (e.g., a mouse), a disk drive unit 616, a signal generation device 618 (e.g., a speaker) and a network interface device 620.

The disk drive unit 616 includes a computer-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting computer-readable media.

The software 624 may further be transmitted or received over a network 626 via the network interface device 620 utilizing any one of a number of well-known transfer protocols (e.g., HTTP or FTP).

While the computer-readable medium 622 is shown in an example embodiment to be a single medium, the term "computer-readable medium" should be taken to include a single medium or multiple media (e.g., a centralised or distributed database, and/or associated caches and servers) that store the one or more sets of instructions. The term "computer-readable medium" shall also be; taken to include any medium that is capable of storing, encoding or carrying a set of instructions for execution by the machine and that cause the machine to perform any one or more of the methodologies of the present embodiments, or that is capable of storing, encoding or carrying data, structures utilised by or associated with such a set of instructions. The term "computer-readable medium" shall accordingly be taken to include, but not be limited to, solid-state memories, optical and magnetic media, and carrier wave signals.

Any one or more of the apparatus 100, 200, 300, 22 may be in the form of the computer system 600, or may at least include some of the components thereof.

The Inventor believes that the invention as exemplified provides an apparatus 100; 200, 300, 22 a system 10, and a method 500 having a number of advantages. By employing a combination of transceiver/detector redundancy and multiple detection techniques, reliability is achieved. Repeatability is realised by ensuring best distance measurement accuracy is possible under given environmental and installation conditions. Comfort and convenience is provided by ensuring that proximity information conveyed to the miner/vehicle operator is accurate and informative in a such a way as to minimise any annoyance factor.

The invention claimed is:

1. A collision avoidance apparatus which includes:
    a UHF (Ultra High Frequency) transceiver operable to send and receive UHF signals in the form of UHF data packets of short burst duration in electric field (E-field) mode, the UHF signals having long range but low resolution;
    a VLF (Very Low frequency) transceiver operable to send and receive VLF signals in magnetic field (H-field) mode, the VLF signals having short range and medium to high resolution, and being impervious or at least resistant to obstructions;
    a SHF (Super High Frequency) transceiver operable to send and receive SHF signals in the form of SHF data packets in rapid succession in electric field (E-field) mode, and in which time of flight the SHF signal varies depending on the distance between transmitter and receiver, the SHF signals having medium range and high resolution;
    a control module comprising a processor and a non-transitory computer-readable medium having stored thereon a computer program configured to direct the operation of the processor, and hence of the apparatus, when executed by the processor, to:
        detect receipt of a signal via at least one of the transceivers to determine that a second signal-transmitting apparatus, and hence an object associated with the second apparatus, is proximate;
        determine miniscule differences in the time of flight of the SHF signal;
        determine or at least estimate a distance of the second apparatus by analysing the characteristics of the received signal(s) and the measured time of flight differences such that the disadvantages of each transmission technology (UHF, VLF and SHF) is compensated for by the advantages of the others; and
        determine whether or not an alert is to be issued, based on the nature of the received signal; and
    an output arrangement operable to issue an alert in response to instruction from the control module to do so.

2. An apparatus as claimed in claim 1, in which the control module is configured to define a plurality of proximity zones and further is configured to categorise/classify the second apparatus as being in one of the plurality of proximity zones, based on the estimated distance to the second apparatus.

3. An apparatus as claimed in claim 2, in which the control module is configured to raise one of a plurality of alerts, depending on the proximity zone into which the second apparatus has been categorised.

4. An apparatus as claimed in claim 2, in which the control module is operable dynamically to adjust the dimensions or boundaries of the respective proximity zones.

5. An apparatus as claimed in claim 1, in which the control module is configured to approximate a distance from the second apparatus based on a strength of a UHF signal received from the second apparatus.

6. An apparatus as claimed in claim 1, in which the VLF transceiver (or electromagnetic antenna) is operable to send and receive H-field based signals a distance of up to 15 m and in which the control module is operable to resolve signals received by the VLF transceiver with a resolution of 1 m.

7. An apparatus as claimed in claim 1, in which the SHF transceiver can provide resolution in the order of 0.5 m.

8. An apparatus as claimed in claim 1, which includes a GPS (Geographic Positioning System) module operable to determine GPS coordinates of the object with which the apparatus is associated.

9. An apparatus as claimed in claim 1, which includes a motion detector operable to measure instantaneous angular velocity, instantaneous 3-axis acceleration/deceleration, instantaneous speed, and/or motion status detection.

10. An apparatus as claimed in claim 1, which includes a video capture device.

11. An apparatus as claimed in claim 2, in which there are four defined proximity zones which are generally concentric, radiating outwardly from the apparatus.

12. An apparatus as claimed in claim 11, in which the alerts are dependent upon the zone which the second apparatus is determined to be in.

13. An apparatus as claimed in claim 1, which is in the form of a personnel apparatus intended to be worn or carried on a person and which is connected to, or integrated with, standard mining equipment routinely worn by mining personnel.

14. An apparatus as claimed in claim 13, which includes an input arrangement operable to receive an emergency input, in response to receipt of which, the control module is operable to direct at least one of the transceivers to send an emergency signal directing proximate vehicles to stop or brake.

15. An apparatus as claimed in claim 13, which is configured to ignore certain classes of apparatus and only to respond to other classes of apparatus.

16. An apparatus as claimed in claim 1, which is in the form of a vehicle apparatus intended to be installed or mounted in a vehicle and which includes a plurality of VLF transceivers at locations around the vehicle to which the vehicle apparatus is mounted or installed.

17. An apparatus as claimed in claim 16, which is connected to a control system of the vehicle.

18. An apparatus as claimed in claim 16, which includes a display arrangement in the form of at least one selected from the group composed of:
- light emitter only integrated with control module: configured to be mounted in a cabin and to flash in response to detection of a proximate second apparatus;
- an advanced display integrated with control module: configured to be mounted in a cabin and to indicate cardinal threat direction and includes a loudspeaker;
- an advanced display separate from the control module: the control module may be mounted in the engine compartment or other discreet location; and
- an advanced display, including video support, separate from the control module: the display is operable to display video streams captured by cameras.

19. An apparatus as claimed in claim 1, which is in the form an obstacle apparatus intended to be attached to fixed obstacles and which is configured to perform at least one of the following tasks:
- transmit self-test signal: this will force any proximate vehicle apparatus to perform a self-test sequence recognisable by a vehicle operator;
- transmit disable signal: this will force any proximate apparatus to cease functioning, which may be useful for example in an underground workshop;
- transmit learn all signal: this will direct any proximate vehicle apparatus to place all other apparatus currently proximate the vehicle apparatus on an exception list so that they are ignored until they are removed and then reappear;
- transmit learn vehicles signal: this will direct any proximate personnel apparatus to place all vehicle apparatus currently proximate that personnel apparatus on an exception list so that they are ignored until they are removed and then reappear;
- transmit disable/enable audio alarm signal: this is used to disable/enable audio alarms temporarily in proximate vehicle apparatus which may be distracting to a vehicle operator; or
- transmit hazard notification signal: this is used to notify proximate apparatus that they are in close proximity to a hazardous area, such as an unsupported underground roof.

20. A method of collision avoidance, the method including:
- sending and receiving UHF signals in the form of UHF data packets of short burst duration in electric field (E-field) mode using a UHF transceiver, the UHF signals having long range but low resolution;
- sending and receiving VLF signals in magnetic field (H-field) mode using a VLF transceiver, the VLF signals having short range and medium to high resolution, and being impervious or at least resistant to obstructions;
- sending and receiving SHF signals in the form of SHF data packets in rapid succession in electric field (E-field) mode using a SHF transceiver, and in which time of flight of the SHF signal varies depending on the distance between transmitter and receiver, the SHF signals having medium range and high resolution;
- directing the operation of the respective transceivers by means of a control module comprising a processor and a non-transitory computer-readable medium having stored thereon a computer program configured to direct the operation of the processor, thereby to:
  - detect receipt of a signal via at least one of the transceivers to determine that a second signal-transmitting apparatus, and hence an object associated with the second apparatus, is proximate;
  - determine miniscule differences in the time of flight of the SHF signal;
  - determine or at least estimate a distance to the second apparatus, based on the received signals;
  - determine whether or not an alert is to be issued; and
  - in response to determining that an alert is to be issued, issue, via an output arrangement, the alert.

21. A method as claimed in claim 20, which includes defining a plurality of proximity zones and classifying the second apparatus in one of the zones, based on its distance.

22. A method as claimed in claim 21, which includes raising an alert depending on a specific zone in which the second apparatus is detected.

23. A method as claimed in claim 21, which includes dynamically varying a size of the proximity zones based on operational criteria.

24. A method as claimed in claim 20, which includes directing automatically the operation of a vehicle in accordance with signals detected by a vehicle apparatus associated with that vehicle.

25. A non-transitory computer-readable medium having stored thereon a computer program which, when executed by a processor, is operable to direct the processor to:
- send and receive UHF signals in the form of UHF data packets of short burst duration in electric field (E-field) mode using a UHF transceiver, the UHF signals having long range but low resolution;
- send and receive VLF signals in magnetic field (H-field) mode using a VLF transceiver, the VLF signals having short range and medium to high resolution, and being impervious or at least resistant to obstructions;

send and receive SHF signals in the form of SHF data packets in rapid succession in electric field (E-field) mode using a SHF transceiver, and in which time of flight of the SHF signal varies depending on the distance between transmitter and receiver, the SHF signals having medium range and high resolution;

direct the operation of the respective transceivers by means of the processor, thereby to:

detect receipt of a signal via at least one of the transceivers to determine that a second signal-transmitting apparatus, and hence an object associated with the second apparatus, is proximate;

determine miniscule differences in the time of flight of the SHF signal;

determine or at least estimate a distance to the second apparatus, based on the received signals;

determine whether or not an alert is to be issued; and in response to determining that an alert is to be issued, issue, via an output arrangement, the alert.

* * * * *